July 19, 1960     J. J. DICKTEL     2,945,340
SELF-CLEANING RAKE
Filed Sept. 23, 1958
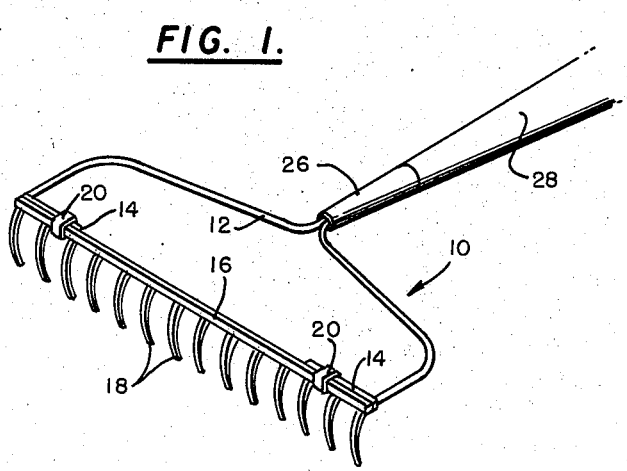
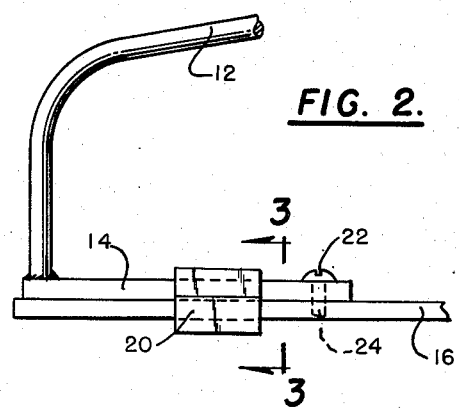
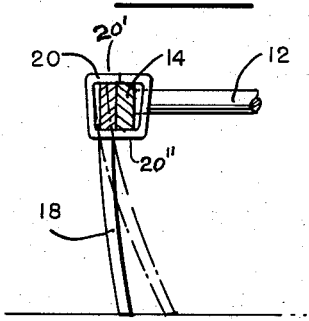
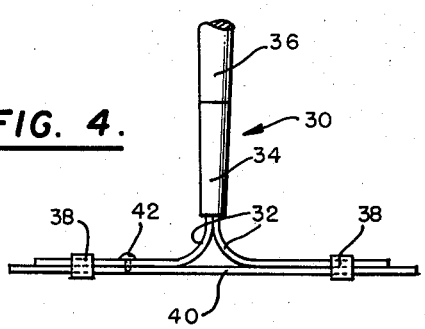
INVENTOR
Joseph J. Dicktel 2,945,340

SELF-CLEANING RAKE

Joseph J. Dicktel, Rte. 2, Box 150B, Waupaca, Wis.

Filed Sept. 23, 1958, Ser. No. 762,825

1 Claim. (Cl. 56—400.2)

This invention relates to garden equipment and more particularly to a garden rake.

It is an object of the present invention to provide an all purpose rake for use in gardens, lawns, and other areas that will enable the tines thereof to be quickly and easily cleaned during use.

Another object of the present invention is to provide a self-cleaning rake of the above type in which the cross bar supporting the tines is hingedly carried upon the main frame of the rake so as to be selectively movable into a ground engaging position upon the return stroke of the rake to effectively clean debris out of engagement with the tines.

Other objects of the invention are to provide a self-cleaning rake bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a perspective view of a self-cleaning rake made in accordance with one form of the present invention;

Figure 2 is an enlarged fragmentary top plan view of certain parts of the rake shown in Figure 1;

Figure 3 is a fragmentary transverse cross sectional view taken along line 3—3 of Figure 2; and Figure 4 is a fragmentary top plan view of a slightly modified form of construction.

Referring now more in detail to the drawing, and more particularly to Figures 1 to 3 thereof, a self-cleaning rake 10 made in accordance with the present invention is shown to include a main frame 12 that includes a pair of forwardly and outwardly diverging elements that terminate in a pair of inwardly directed, spaced apart arms 14. These arms 14 are of substantially the same rectangular cross-sectional configuration as that of a cross bar 16 which extends therebetween. This cross bar 16 is provided with a plurality of integral and longitudinally spaced apart depending tines 18 of general conventional size and shape.

As is more specifically illustrated in Figure 3 of the drawing, a pair of longitudinally spaced apart sleeves 20 of general trapezoidal shape in section having a larger upper base side 20' disposed above the smaller lower base side 20", pivotally loosely secure the cross bar 16 to the arms 14. Because of the internal sectional shape of the sleeves 20, the cross bar 16 and tines 18 can assume a natural position as the rake is pulled through the leaves, soil, or the like. The joined cross sections of the arms and cross bar span the inner width of the smaller lower base side of the sleeve while the upper edges of the arms and cross bar lie short of the internal width of the larger upper base of the sleeve. However, in response to a pushing movement of the rake in an opposite direction, the tines 18 and cross bar 16 rotate slightly within the sleeves 20 as indicated by the dot and dash lines so that the front surface of the tines may be slidably drawn along the surface of the ground so that any particles wedged between the tines can be readily dislodged. Then, as soon as the rake is drawn back toward the user, the tines automatically assume their proper upright position.

In order to prevent longitudinal movement between the cross bar 16 and the arms 14, a set screw 22 extending through one of the arms 14 is slidably received within an enlarged slot 24 in the cross bar 16. Thus, while allowing the aforementioned pivotal movement, the set screw 22 prevents the cross bar 16 from moving longitudinally relative to the arms 14. The main frame 12 is secured to the handle 28, such as by a ferrule 26 in a well known manner.

With reference now to Figure 4 of the drawing, a slightly modified form of construction 30 is shown wherein the main frame is in the form of a pair of oppositely extending arms 32 that project outwardly from the front end of the ferrule 34 which secures them to the handle 36. Spaced apart sleeves 38, similar to those described hereinbefore in connection with the embodiments of Figures 1 to 3, pivotally secure the cross bar 40 and depending tines to the arms 32 for the aforementioned pivotal movement. Also, a set screw 42 carried by one of the arms 32 is slidably received within an enlarged slot in the cross bar 40 to prevent longitudinal relative movement between the cross bar 40 and main frame. Other than the shape of the main frame, the manner of operation and use of this form of the invention is substantially the same as that hereinbefore explained.

While various changes may be made in the detail construction, it shall be understood that such changes shall be withihn the spirit and scope of the present invention as defined by the appended claim.

What I claim as new and desire to protect by Letters Patent of the United States is:

A self-cleaning rake comprising a pair of opposing forwardly and outwardly diverging elements terminating respectively in opposing arms laterally-spaced from each other, a handle rigidly secured to the diverging elements, a cross bar having rake tines depending therefrom and spanning the diverging elements and lying adjacent to the outer faces of the opposing arms, sleeves of trapezoidal shape and section having a larger upper base side and a smaller lower base side, said sleeves loosely pivotally joining the cross bar to the opposing arms to permit the cross bar and tines to pivot rearwardly as the rake is used to pull the leaves, soil and the like and to pivot in the opposite direction by a pushing movement of the rake to dislodge any leaves, soil or the like disposed between the tines, the joined cross sections of the arms and cross bar spanning the inner width of the smaller lower base side of the sleeve with the upper edges of the arms and cross bar lying short of the internal width of the larger upper base of the sleeve and means for securing the cross bar to the arms to hold the cross bar to the arms to hold the cross bar against movement longitudinally of the arms.

References Cited in the file of this patent

UNITED STATES PATENTS

| | | |
|---|---|---|
| 530,041 | Gifford | Nov. 27, 1894 |
| 1,607,037 | Barnes | Nov. 16, 1926 |
| 1,612,894 | Thompson | Jan. 4, 1927 |
| 1,686,781 | Williamson | Oct. 9, 1928 |